Sept. 17, 1968          F. J. GEROW          3,402,243

TREATMENT OF LIVING BODIES BY IMMERSION IN SILICONE FLUID

Filed July 9, 1965          4 Sheets-Sheet 2

INVENTOR.
FRANK J. GEROW

BY

*Angus & Mon*

ATTORNEYS.

Sept. 17, 1968 F. J. GEROW 3,402,243
TREATMENT OF LIVING BODIES BY IMMERSION IN SILICONE FLUID
Filed July 9, 1965 4 Sheets-Sheet 3

INVENTOR.
FRANK J. GEROW
BY
Angus & Mon
ATTORNEYS.

Sept. 17, 1968  F. J. GEROW  3,402,243
TREATMENT OF LIVING BODIES BY IMMERSION IN SILICONE FLUID
Filed July 9, 1965  4 Sheets-Sheet 4

INVENTOR
FRANK J. GEROW
BY
ATTORNEYS.

United States Patent Office 3,402,243
Patented Sept. 17, 1968

3,402,243
TREATMENT OF LIVING BODIES BY
IMMERSION IN SILICONE FLUID
Frank J. Gerow, Houston, Tex., assignor, by mesne assignments, to Dow Corning Corporation, Midland, Mich., a corporation of Michigan
Continuation-in-part of applications, Ser. No. 247,637, Dec. 27, 1962, and Ser. No. 326,518, Nov. 27, 1963. This application July 9, 1965, Ser. No. 473,561
7 Claims. (Cl. 424—184)

ABSTRACT OF THE DISCLOSURE

Method of treatment of living bodies including humans, e.g., for burns, by immersion in a bath of liquid silicone. The immersion system includes a tank, pumping means for circulating liquid through the tank producing circulation and turbulence, a filtering device for removing foreign material from the liquid, and a movable supporting device for supporting a patient in the tank.

---

This invention relates to the treatment by immersion of living bodies. This is a continuation-in-part of my copending applications Ser. No. 247,637, filed Dec. 27, 1962, now abandoned and Ser. No. 326,518, filed Nov. 27, 1963, now abandoned.

A principal object of the invention is to provide an effective method and means for carrying out such an immersion treatment.

An important aspect of the invention resides in the treatment of burns and other forms of dermatological lesions on the bodies of living creatures including animals and humans, these being herein referred to as patients. Burns are classified in accordance with the depth of destruction of underlying body tissue as a first, second, or a third degree burn, the third degree burn being the most severe. First and second degree burns do not destroy the regenerative layer of the skin so that they may heal without consequential scarring. However, third degree burns destroy the regenerative layer resulting in scarring. Moreover, a patient suffering from a severe third degree burn exhibits a high degree of shock and there is a loss of blood plasma in the burned area resulting in edema around the burned area. The burned tissue becomes devitalized and is highly susceptible to bacterial invasion resulting in infection. At the present time a patient with third degree burns over 30 percent or more of his body may survive the initial stages of the burn and its associated shock only to contract septicemia in the region of the destroyed tissue. Septicemia is a condition commonly resulting from a serious burn where pathogenic organisms of bacteria circulate in the blood stream resulting in fever and the likelihood of death.

One method of minimizing the danger of infection in cases involving burns and other forms of dermatological lesions, is to maintain the patient in a sterile environment. When placed in an enviroment in which bacteria cannot exist or a media in which the rate of growth and multiplication of bacteria is sufficiently low as to allow separation or sterilization of bacteria at a faster rate than the progress of multiplication, it is possible to effectively isolate the patient from bacteria customarily encountered in air and water. Perspiration, body fluids, dead tissue and other organic matter eminating from the patient may, however, serve to support bacterial growth even in an otherwise sterile environment and, hence, means must be provided to eliminate these substances lest they provide a medium for bacterial growth.

An important object of this invention is therefore to provide a means for maintaining a patient suffering skin lesions, burns or the like in a sterile environment.

A further object of this invention is to provide means for ensuring maximum comfort and ease of handling for a patient being maintained in such an environment.

The sterile environment used in the practice of my invention should be a liquid bacteriostatic medium having the following essentials:

(1) The medium should be liquid at a temperature of 25° C. or below.

(2) The medium must be a hydrophobic material, virtually insoluble in water.

(3) It must be essential inert, physiologically, producing no toxic effects when applied externally for prolonged period of time or when injected or absorbed subcutaneously into a living animal. The medium must not irritate or produce maceration of the skin and must not interfere with skin grafting or normal healing processes.

(4) The medium should be chemically stable so as to prevent the formation of undesirable degradation products.

(5) The medium must not encourage or support the existence or growth of bacteria.

In addition to the essential requirements noted above, it is desirable that this fluid medium be odorless and have a density close to or greater than that of the patient to minimize tissue damage and fatigue. The medium should not, however, be so dense as to cause the patient to float above the surface of the sterile medium. Ideally the patient will be suspended in an essentially weightless condition.

It is also desirable that the medium be transparent, so as to allow inspection of the patient without disturbing either the patient or the injury. The medium is preferably non-volatile so as to minimize loss and to avoid ingestion by respiration.

It is desirable, of course, that the medium should not have a tendency to produce cancers.

I have found that a family of silicone compounds, sometimes referred to as silicone fluids, possesses all of these desired properties for the fluid medium used in the practice of my invention. The compounds to which I refer are compositions in which the siloxane unit, —Si—O—Si—, is the continuing framework. Each silicon atom generally has one or two organic groups attached to it. For the practice of my invention the organic groups must be essentially non-reactive and hence are limited to lower alkyl groups such as methyl and ethyl, alkenyl groups such as vinyl, aryl groups such as phenyl and arylalkyl groups such as benzyl. In general, suitable siloxanes are those whose substituants are of the group consisting of lower alkyl, aryl, alkenyl and arylalkyl radicals and combinations thereof and mixtures thereof. The most commonly available silicone oils useful in the practice of my invention are those in which the organic groups are methyl or methyl and phenyl. Other types are available such as the diethyl siloxanes, ethyl methyl siloxanes, methyl benzyl siloxanes, etc., however, these materials are quite costly at the present time due to their limited availability. Alkoxy siloxanes may also be used, however, their somewhat lower chemical stability renders them less attractive for economic reasons.

These materials are readily produced by conventional means. For example, the dimethyl siloxanes are produced by adding dimethyl-dichlorosilane into strongly acidified water. Molecular weights are controlled by adding end-blockers such as trimethylchlorosilane. Other members of this family of silicone fluids are prepared in this same manner by selecting the appropriate starting material, for example, diethyldichlorosilane, when it is desired to produce diethylsiloxane. It will be appreciated that mixtures of starting materials can also be used, and in varying proportions if desired, to produce hybrid siloxanes such as dimethyl-diethyl siloxanes, dimethyl-methylphenyl siloxanes, etc.

Diorganosiloxane fluids have the empirical formula $R_nSiO$, wherein $n$ has some numerical value. Commercially, most such fluids carry an end-blocker on the chain of the type $R_3SiO_{0.5}$. Thus most siloxane fluids respond to the empirical formula $$R_nSiO_{\frac{4-n}{2}}$$

where $n$ has a value from 2 to 2.25. Another variety of fluid suitable for use in this invention are those of the last stated empirical formula in which $n$ has a value below 2. Such fluids have a value of $n$, of at least 1.85. These are copolymers of $RSiO_{1.5}$ and $R_2SiO$ containing 15% or less of the former and 85% or more of the latter. Thus, for purposes of this invention, silicone fluids having an empirical formula $$R_nSiO_{\frac{4-n}{2}}$$

in which $n$ has a value from 1.85 to 2.25 are the preferred liquid bacteriostatic media used in accordance herewith. As used herein, R represents alkyl, alkenyl and aryl radicals.

Variations in polymer chain length, molecular weight, produce corresponding changes in viscosity, melting point, flash point and specific gravity. Consequently, the desired physical properties of the silicone fluids used in the practice of my invention can be obtained simply by varying the molecular weight of the particular polymer selected. Since the silicone fluids are readily miscible with each other, the desired properties can also be obtained by blending of various silicone fluids. It is not practical to describe the liquids useful in the practice of my invention in terms of any particular chemical structure, due to the complexity of the molecules; moreover, any of the inert silicone fluids having the proper physical properties can be used.

The silicone fluids exhibit extremely high heat stability over long periods of time at temperatures below 150° C. even when exposed to air. They exhibit an equally high chemical stability to nearly all aqueous solutions and other contaminants likely to be introduced in the practice of my invention. They are non-corrosive to metals and have little effect on rubber gaskets and the like.

The silicone fluids are odorless and practically inert physiologically. Application to skin and even injection into test animals, have produced no evidence of toxicity. The higher viscosity silicone fluids (above about 50 centistokes) are non-volatile. No signs of toxicity have been observed in monkeys exposed to volatile silicone fluids over extended periods of time. They are highly water repellant and are insoluble in water and thus are not absorbed through granulating tissue. In addition they are excellent lubricants and exhibit light transmission of substantially 100% in all visible wave lengths.

The preferred physical properties for the silicone fluids useful in the practice of my invention are as follows:

Viscosity, in centistokes (cs.) at
25° C _______________________ 50 to 1,000
Melting point _______________ ° C. Below about 25
Specific gravity 25°C/25°C ___ 0.9 to about 1.2

The preferred silicone fluids for the practice of my invention are the dimethylsiloxanes and the phenylmethyl siloxanes. One example of a dimethylsiloxane found to be particularly suited for the practice of my invention is a dimethylsiloxane, trimethylsiloxane end-blocked, sold under the trade name of "Dow Corning 360 Fluid" produced by Dow Corning Corporation of Midland, Mich. The preferred viscosity grade of this material for purposes of this invention is 100 cs. at 25° C., which product has a specific gravity of 0.968 and a freezing point of −67° F. Alternatively, a higher viscosity grade is desirable under particular conditions, as for example, the grade having a viscosity of 350 cs. which has a specific gravity at 25° C. of 0.972 and a freezing point of −58° F. Another useful polysiloxane fluid is Dow Corning 550 Fluid which is a copolymer of dimethylpolysiloxane and phenylmethylpolysiloxane in which substantially 25% of the number of organic radicals are phenyl radicals and 75% methyl radicals. Typically, it has a viscosity of 100 to 150 cs. at 25° C. and a specific gravity at 25° C. of 1.06 to 1.08. It is to be noted that these two fluids are miscible. Accordingly they can be used in mixture to provide variation in specific gravity whereby to exactly duplicate, if desired, the specific gravity of the body. Still another useful silicone fluid is Dow Corning 710 Fluid which is a trimethylsiloxy end-blocked phenylmethylsiloxane copolymer, having a viscosity of 500 cs. at 25° C. and a specific gravity of 1.01. It has a pour point of −8° F. This fluid is miscible with the Dow Corning 550 Fluid; hence the 710 Fluid and the 550 Fluid can be used in mixture.

Equipment useful in the practice of my invention involves a tank for containing the liquid, the tank being provided with a cradle to support the patient therein. Provision is made for the circulation of the liquid in the tank through a filter to obtain a surgically clean bath for the immersion of the patient. According to a preferred feature, the cradle in the tank can be raised and lowered so that the patient may be immersed into or removed from the liquid in the tank as desired.

In cases of serious body burns it may be necessary that the patient remain in the tank for as long as thirty days while the damaged skin heals. Accordingly, another preferred feature resides in the provision of a bed pan for purposes of bowel movements; and also a urine catheter so that the patient need not be removed from the substance for urination purposes. Another preferred feature resides in the provision for a tube to pass through the tank and attached to the patient for purposes of intravenous feeding.

Further features which are optional, but desirable, involve the blowing of a gas such as air into liquid in the tank in the region of the patient to create a gentle turbulence against the patient's skin for clearing away solid matter at the skin. Related features involve provision of means for diverting or emptying the fluid, such as silicone fluid, from the immersion tank so that a substitute liquid, such as water may be temporarily introduced into the tank.

Although treatment of burns and skin lesions constitutes an important use for the invention, it is not necessarily so limited. For example, it may be used in temperature therapy. By proper control of the temperature of the circulating liquid, the patient may be hibernated to reduce his metabolic rate by as much as 54%. This is especially helpful in the treatment of heart ailments where the patient's metabolic output would cause death.

The foregoing and other features of this invention will be more easily understood in the following detailed description and accompanying drawings of which.

Before proceeding with a description of the drawings, it will aid in understanding the invention to consider the following brief description of the method by which patients suffering burns or other forms of dermatological lesions may be treated in accordance with my invention.

It will be appreciated that this method of my invention is not limited to any specific form of apparatus.

The patient is immersed in any suitable tank or other apparatus in a bacteriostatic medium having the physical properties heretofore described so as to immerse all but the patient's head or alternatively the portion or portions of the patient's body requiring treatment. For reasons expressed above, it is desirable that the medium have a density approximating that of the patient to minimize support requirements. Some support is usually required and should be designed so as to provide as much comfort as possible as the patient will normally remain immersed until the afflicted area has healed, usually a period of time on the order of 30 days. There is not any definite time of treatment, though, as the treatment time will depend upon the patient's course. Successful immersion treatments have been made in as short a time as seven days, and in as long a time as thirty-five days. The time of the immersion could be carried out indefinitely if the patient's condition should warrant it. Although water immersion or electrolyte immersion can get the patient in serious difficulty if maceration of normal skin is produced, the use of the treatment of the present invention can be carried on safely for long periods of time. In some cases a somewhat denser medium may be used, in which case provisions for anchoring the patient in position is important.

It is often desirable in case of extensive burns or burns coupled with other serious injuries, heart disease, etc., to hibernate the patient in order to reduce the patient's metabolic rate, lessen heart strain, etc. Treatment of shock or illness may also be enhanced by temperature manipulation, accordingly it is important to provide a means for constant regulation of the temperature of the fluid medium either at the patient's normal body temperature or at some other temperature conducive to improving the patient's chances for recovery. Under normal circumstances the temperature of the bath will be maintained between 86° F. and 89° F., in the case of human patients. In the case of animal patients preferred temperatures may be different. While a temperature of 87° F. to 88° F. appears to be optimum for normal human patients, it has been found that the larger the burn and the sicker the patient, the higher is the temperature which should be used, even above 89° F. In the case of human patients with very high body temperatures, for example, it may be found desirable to start the treatment with a bath temperature as high as about 92° F. and then gradually bring the temperature down to the more optimum value of about 88° F. The bath temperature will almost never be brought higher than 93° F., as the human patient will be sweating at 94° F. The above-mentioned temperatures pertain to maintaining the human patient in a conscious state breathing on his own. In the case of extraordinary situations, however, such as for example hypothermia then of course the bath temperature would be lowered below 87° F. in order to effect the lowering of the human patient's temperature. At some point of lowered temperature, though, the patient would become unconscious and need respiratory assistance. The lowest practical temperatures used in such extraordinary situations will vary from patient to patient, and will depend on his condition. It appears probable that the lowest sustained temperature that will ever be used for a human patient will be about 80° F. to 81° F.

Once immersed in the medium, the patient will begin to excrete body fluids, primarily perspiration and blood plasma, particles of tissue, blood cells, and bacteria into the medium. To prevent the growth and increase in number of bacteria in the medium, the medium is continuously treated and processed to remove these impurities. It will be understood that the particular methods of filtering, dehydrating and removing other impurities from the medium are not critical to this practice of my invention. The important thing is that the processing technique be such that bacteria are removed at a faster rate than the rate at which they are introduced or produced in the medium. In this fashion an essentially sterile environment is provided for the patient. Thus far, clinical tests on both animals and humans using my new method have shown dramatic improvement over conventional techniques in the treatment of burn patients proving the efficiency of my method.

The silicone fluids constituting the bacteriostatic medium, while not a poison to bacteria in the sense that it will actually kill bacteria, is nevertheless one which does not sustain life in the absence of foreign substances; and since it is not adsorbed through granulating tissue and does not macerate the skin tissue of a patient, the medium does not readily acquire bacteria-sustaining substance in this manner. While it is true that bacteria can exist and be sustained in water, it is nevertheless true that water can be substantially eliminated from the medium as a bacteria-sustaining substance, by the practice of my method and equipment, as the medium does not emulsify with water. The silicone fluids constituting the bacteriostatic medium will thus smother the burned tissue area and protect it from water, air or other substance capable of supporting the existence of live bacteria, and will thus act as a barrier keeping bacteria away from the skin tissue. The liquid of the fluid medium circulates about the patient, acting as a washing agent to remove destroyed tissue from the patient, and will also carry off water given up by the patient by perspiration, which can then be removed from the medium.

Since the silicone fluids used in the practice of the invention are temperature stable, the molecular bonds of the liquid do not break down from temperature variation to change the physiochemical characteristics of the solution. Furthermore, they have a relatively low temperature pour-point and a relatively high temperature flash-point.

The length of time a patient may be kept in the liquid will depend to a great extent on the seriousness of the injury; on which the time for substantial healing is dependent. Because the patient may be kept in the liquid for a long time, for example, from a few days to a month or more, its stable quality is important, since it will usually be preferable not to change the liquid frequently during the time of immersion. Changing the liquid in the tank would require draining and cleaning of the tank, during which time the patient would be out of the immersion and could be brought into contact with bacteria supporting materials, unless care is exercised to avoid it. Nonetheless, it may be desirable in the course of treatments, to submit the patient to water baths in the tank as is described hereinafter.

The non-reactivity of the fluid medium is of further importance when it is considered that the patient gives off electrolytes through his normal perspiration cycle, for example, in the form of urea. The silicone fluids do not react with either such acid or basic electrolytes as might be encountered in use in accordance herewith to change the chemical properties of the fluid medium.

Figure 1:
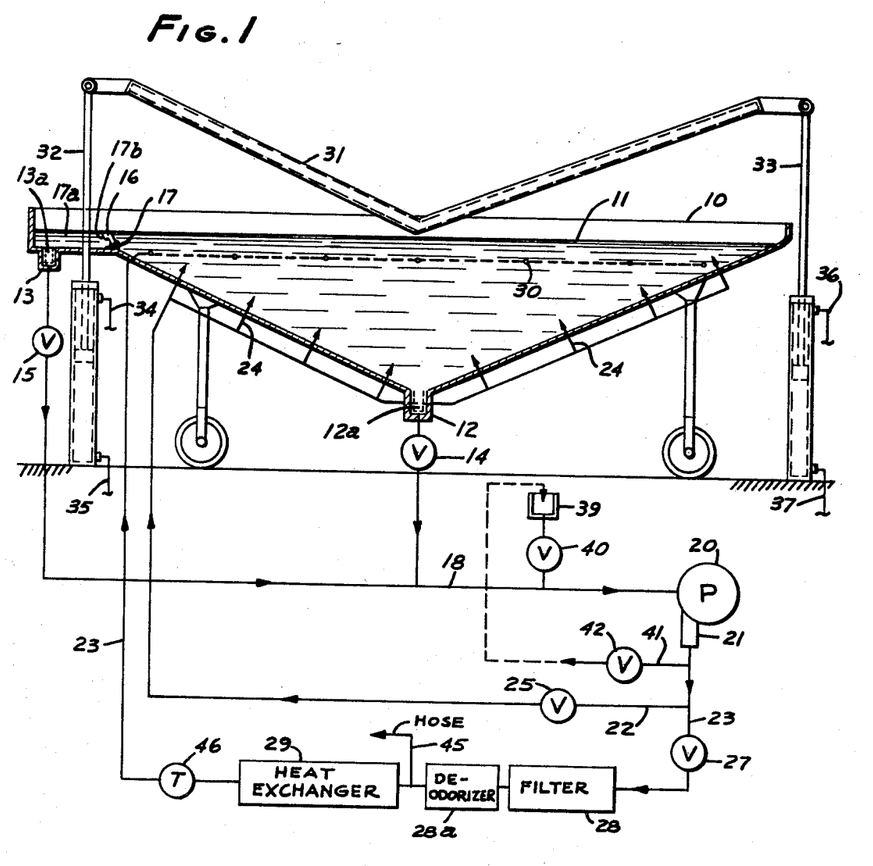
FIG. 1 is a schematic diagram, partly in cross-section, of a system for immersion treatment according to this invention.

Referring to the drawings, FIG. 1 shows a tank 10 adapted for use in the practice of the treatment in accordance with this invention. This arrangement is similar to that shown in the drawing of my said co-pending application Ser. No. 247,637 excepting that a number of refinements and improvements have been added in FIG. 1 of the present application. The tank is shown filled with a bacteriostatic liquid 11 for the immersion of a patient in accordance with this invention; and for convenience in moving it, wheels are provided as shown. The arrangement is in a form adapted for the treatment of human patients (although animals can also be treated in it) and it is assumed that the head of the patient will be at the right end and the feet at the left end, in FIG. 1. The tank is shown in a longitudinal cross-section taken through the center, and the lateral dimension (not shown) will be sufficient to accommodate the shoulders and arms of the patient. Two outlets 12 and 13 are located on the tank and each has a valve 14 and 15 respectively, to open and close the outlets. Outlet 12 is located at the deepest part of the tank, the purpose of which is to drain the tank of the liquid contained therein. A weir 16 attached to a pivot 17 at the front of the tank conforms to the surface level of the liquid in the tank at a desired level and performs a skimming operation to clean the surface of the liquid within the tank. When the level of the liquid rises above the weir, liquid flows over the top of the weir into a compartment 17a at the front of the tank, and thence through outlet 13. Weir 16 is provided with a float 17b tending to keep it near its upright position, as shown, when the liquid level is at its normal full level. In the absence of pumping, the liquid level in compartment 17a is the same as in the tank, the top of the weir being approximately at the liquid level. When liquid is drawn from the bottom of compartment 17a, as by action of pump 20, the liquid level in compartment 17a drops, causing the weir to rotate counterclockwise (with reference to FIG. 1) and allowing the liquid in the tank to flow over the top of weir 16 taking particulate matter suspended in it through outlet 13. The weir is located just back of the outlet 13 and forms the rear wall of the forward compartment 17a through the bottom of which the outlet 13 passes. A stop 17b prevents the weir from rotating in the clockwise direction past the position of the stop. The outlet 13 has a recess with a cylindrical side wall dimensioned to receive a debris basket 13a having an upper rim resting on a ledge of the recess, and a side wall and a bottom in the form of a perforate screen, the bottom being located over the outlet, so that debris floating over the weir will be collected in the basket.

Figure 1A:
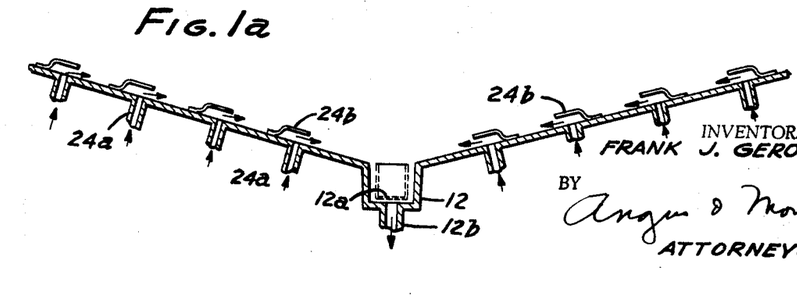
FIG. 1a is a view, in cross-section, of a detail used in the system of FIG. 1.

Upon passing through valves 14 and 15, the discharged liquid from the tank passes through an outlet conduit 18 to pump 20, ordinarily driven by an electric motor. (It is understood that in the drawings, conduits are represented in single line form, with arrows showing direction of liquid flow.) The pump has an outlet 21 which feeds a bypass conduit 22 and a filtering conduit 23. Line 22 serves to pass the liquid from the pump directly back into the tank 10 at a plurality of inlets 24. Although the inlets 24 are simply represented by arrows in FIG. 1, it is preferred that the actual arrangement of these inlets be according to the detail section shown in FIG. 1a. In FIG. 1a, these inlets are shown in the form of pipes or tubes 24a leading through the inclined bottom walls of the tank; and each of these tubes is provided with a baffle 24b having its upper end fastened to the tank wall in a manner to turn the flow of fluid entering the tank through pipes 24a, down along the inner wall of the tank bottom toward the outlet 12, in the direction of the arrows shown in the inside of the tank in FIG. 1a, thereby creating a cleaning or scavaging action along the bottom of the tank to the outlet. The outlet 12 is in the form of a recess having a cylindrical side wall which contains a debris basket 12a ordinarily in the form of a perforate cylindrical screen having a perforate circular bottom located over an outlet pipe 12b from the outlet, so that substantial sized solid debris can thus be collected before the fluid exits through outlet 12. An upper rim of the basket rests on a circular ledge of the recess. Opening a valve 25 between the pump and inlets 24 in the tank allows the liquid to circulate from the outlets 12 and 13 through pump 20 into conduit 22 and into inlets 24. By closing valve 25 and opening a valve 27 in filtering conduit 23, the liquid undergoes a sterilizing process by passing through a filter 28 and a deodorizer 28a, and also a cooling process by passing through a heat exchanger 29; and then back into the tank at a plurality of inlets 30 located around the sides of the tank at a higher level than the drain 12. The filter removes aromatics and particulate matter, including such as is excreted by the patient, in the bacteriostatic liquid; the deodorizer removes offensive odors from the liquid; and the heat exchanger maintains the temperature of the liquid at the desired level. Details of a suitable filter and deodorizer will be described in greater detail hereinafter.

A sling 31 adapted to support a patient within the liquid in the tank may be raised and lowered by a lifting means such as hydraulic lifters 32 and 33. Hydraulic conduits 34 and 35 are connected to operate lift 32, and conduits 36 and 37 are connected to operate lift 33. Hydraulic lift 32 is controlled independently of hydraulic lift 33 so that the head or feet of the patient may be raised and lowered to any desired level in the liquid. The sling is shown as a simple frame which may be constructed like sling 31 of FIG. 2; and to enable the sling to support the patient the frame may be provided with suitable lateral supports extending from one side frame member to the other. The sling is designed so that the hands and feet of the patient, in the case of a human, rest approximately at the heart level of the patient.

Filter 28 is preferably a diatomaceous earth type of filter which absorbs and collects entrapped water and all particulate matter except that which is not substantially smaller than the size of the molecular size of the bacteriostatic liquid. The deodorizer can be of the activated carbon type in which the carbon functions to absorb odors.

Figure 3:
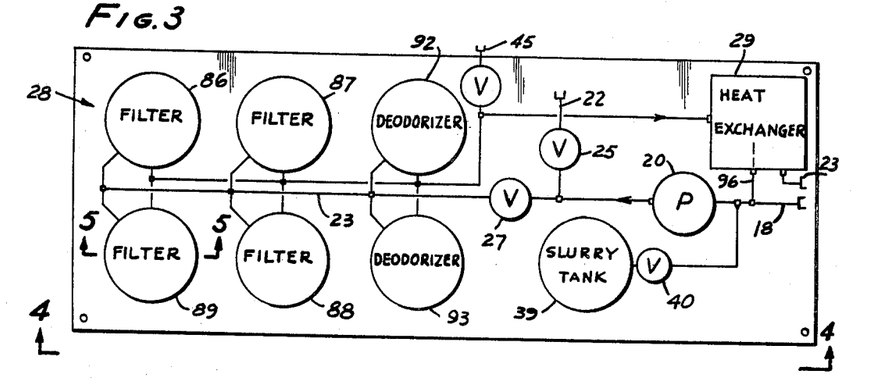
FIG. 3 is a plan view of a filter, deoderizer, and heat exchanger which can be used with the arrangements of FIGS. 1 and 2.
Figure 4:
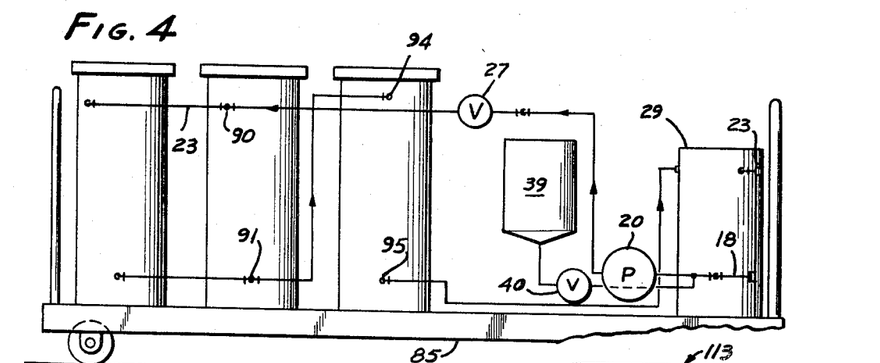
FIG. 4 is a side view taken at line 4—4 of FIG. 3.

The filter 28 and deodorizer 28a can be assembled as shown in FIGS. 3 and 4. A slurry tank 39 is connected through a valve 40 to outlet conduit 18 between valves 14 and 15 and pump 20. The slurry tank is a container adapted to hold a pre-coating substance for pre-coating membranes of the filter, a suitable pre-coating substance being diatomaceous earth. A pipe line 41, attached to the outlet 21 of the pump, has a valve 42, which when open, supplies bacteriostatic liquid from tank 10, when valve 14 is open, for mixing with the pre-coating substance in slurry tank 39 to make a slurry. When diatomaceous earth is used for pre-coating, the slurry will be one of diatomaceous earth in silicone fluid. When valves 14, 25 and 42 are closed, while valve 40 is open, the slurry is pumped from the slurry tank to the filter where the pre-coating substance will adhere to a filter element or membrane in a process described hereinafter in connection with FIG. 5. Details of the deodorizer are shown in FIG. 6.

It is desirable that only the bacteriostatic liquid be used to clean the tang before or after use and that no other foreign substance be used for this purpose. Therefore hose 45, shown connected to the line between the filter and the heat exchanger, is used to clean any sediment from the bottom of the tank as well as for hosing down the patient periodically during treatment.

In the operation of the equipment, the patient will be placed on sling 31, which will then be lowered sufficiently to immerse the patient in the liquid in the tank. During the time of the patient's immersion, the pump 20 will be in operation with valves 14 and 27 open, and valves 40 and 42 ordinarily closed. Valve 25 will be opened sufficiently to give a desired amount of liquid by-pass through conduit 22. Thus, the liquid of the medium will be pumped from outlet 12 (and outlet 13 in the case of overflow over the weir), through conduits 22 and 23 back into the tank through the several inlets, as shown, creating a continuous liquid circulation, accompanied by turbulence, by the patient and a continuous filtering.

During such use of the equipment, heat becomes added to the bacteriostatic liquid in the tank from two sources within the system: one being the heat liberated from the body of the patient, and the second being the heat added to the liquid by the pump and electric motor 20. To remove such generated heat, the heat exchanger has a cooling element, such as a Freon element, and to maintain the temperature of the liquid at a desired level by a thermostat 46. The temperature of the liquid in the tank will be maintained in close proximity to the desired level by the control of room temperature where the tank and apparatus of the system is located. It is usually desired that the temperature level of the liquid be about 86–89° F. While the heat exchanger used is described as being a refrigeration unit, it should be understood that provision may be made so that the liquid could be heated, if necessary, to maintain the desired temperature.

Figures 2, 2A:
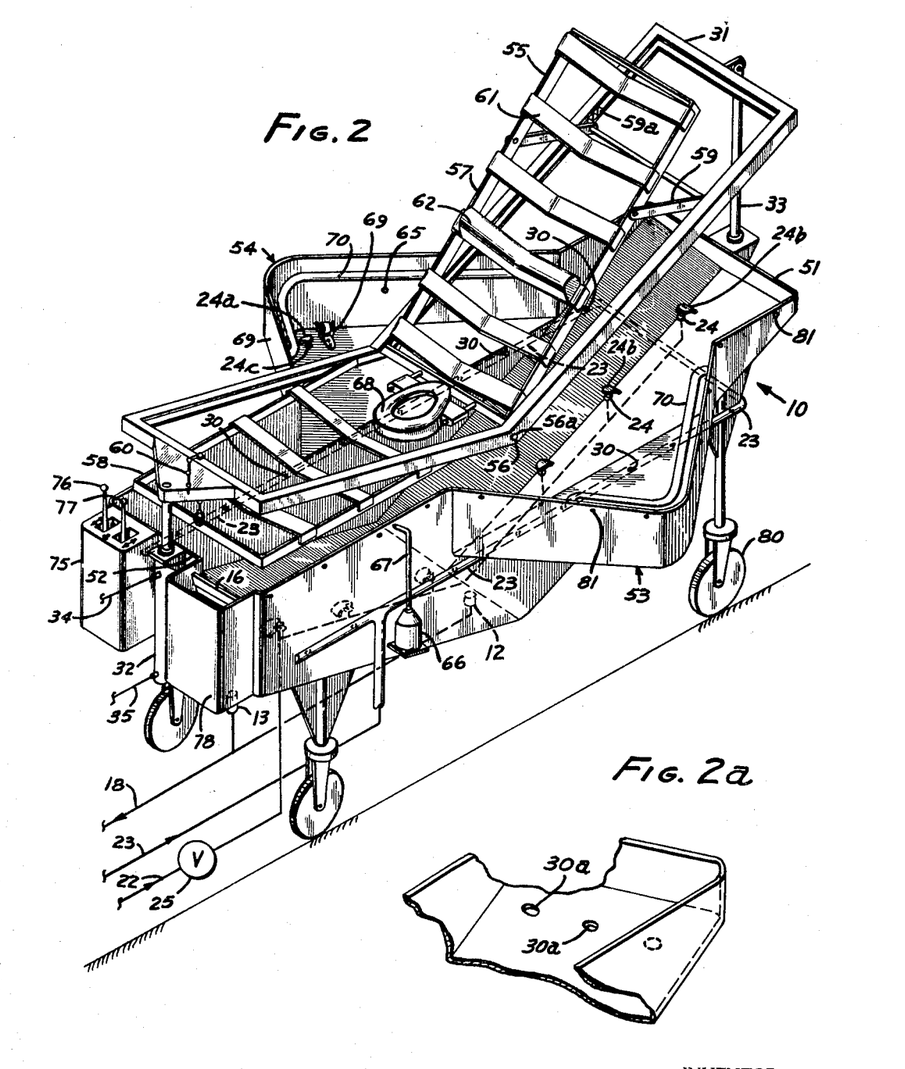
FIG. 2 is an isometric view of an immersion tank in accordance with this invention which is modified from that of FIG. 1.
FIG. 2a shows a detail of the structure of FIG. 2.

The tank shown in FIG. 1 represents a simple form of tank by which the immersion treatment may be practiced. A more convenient form of tang embodying the general structural elements of FIG. 1, and in addition, some further refinements and conveniences is that shown in FIG. 2. Like parts are given the same identifying numbers in FIGS. 1 and 2. The structure of FIG. 2 is similar to that of FIG. 1 in that it allows the patient to lie in a reclining position so that his arms and legs are approximately on the same horizontal level with the heart. The bottom of the tank tapers downward toward the center with outlet 12 located at the deepest part of the tank. The tank has a head end 51 and a foot end 52 at opposite ends thereof with hydraulic lifts 32 and 33 disposed at each end respectively. The tank has two wing-like sections 53 and 54 disposed on opposite sides of the tank at the approximate location of the arms of the patient. The wing-like sections extend away from the tank and have a configuration to allow the patient to spread his arms out while within the tank so that his arms will not be restricted to lie at his side, thus permitting exercising and reducing the chances of axillary contractions.

The rectangular sling 31 as shown in FIG. 2 supported by hydraulic lifts 32 and 33 is bent at an apex 56 between the two ends to conform with the reclining position of the patient bent slightly at the waist. An adjustable cradle 55, on which the patient is to lie, is hinged to the sling 31 at apex 56. Cradle 55 has a head end section 57 and a foot end section 58, each disposed adjacent ends 51 and 52, respectively, of tank 10. Sections 57 and 58 are each pivoted at apex 56 on the hinges 56a and adjusted to a desired level from frame 35 by a suitable supporting means. By adjustment of the cradle the patient may change his position relative to the sling and may be bent more or less than the sling as he desires for his comfort. For example, head end section 57 may be raised and lowered upon the sling by a supporting member 59 slidably engaged in notches 59a on the sling. Similarly, the foot section of the cradle may be raised and lowered with respect to the sling by physically raising and lowering a bead chain 60 rigidly attached at one end to the cradle and which may be attached to the sling when the cradle is adjusted to the desired level with respect to the sling. By operation of the hydraulic lift means 32 and 33 as well as the sliding of member 59 and raising or lowering the foot section by means of the bead chain 60, the patient may be disposed in the tank at any desired position.

Cradle 55 has lateral members 61 extending across the cradle designed to support the patient. Members 61 are slidable longitudinally along the side frame members of the cradle and may be moved to any desired position. Pillows such as pillow 62 may be attached to members 61 so that the patient will not lie directly upon members 61 but rather on a softer pillow. Pillow 62 may be made of a spongy filler material which may be embodied within a vinyl plastic sheet which is heat sealed so that no fluid from the medium may come in contact with the spongy material therein. Any plastic capable of resisting attack by the chemicals within the tank will suffice for coating the filler of the pillow. It is preferred that members 61 as well as the sling, cradle and tank be made out of a corrosion resistant material such as stainless steel.

A hole 65 is disposed through the wall of the tank at the approximate position of the stomach of the patient to provide access for a tube for intravenous feeding of the patient while in the tank. A urine catheter 66 is attached on the outside wall of the tank and has a tubular member 67 passing through the wall of the tank so that the patient need not be removed from the liquid for purposes of urination.

A bed pan 68 may be attached to the cradle 55 at the apex 56 of the sling and may be removable from the cradle. The hydraulic lifts 32 and 33 raise the patient out of the medium and upon completion of the bowel movement the bed pan is removed from the cradle and the patient is lowered back into the bacteriostatic liquid.

Restraining straps 69 are attached at the tank at the wing sections and the patient's wrists may be strapped thereto. The patient has a natural tendency while submerged in the liquid to bring his arms in towards the body. The restraining straps will hold the patient's arms away from the body to keep burned surfaces from being touched unnecessarily.

For purposes of exercising, the patient may use a handrail 70 disposed in each of the wing sections 53 and 54 to flex the muscles in his chest, arms and shoulders if he desires.

Lift means 32 and 33 have hydraulic controls 75 located at the foot end 52 of the tank. Control 75 has two separate levers 76 and 77, each operating a respective one of the two hydraulic lifts.

A surface skimmer compartment 78 comprises weir 16 provided with a float, as in the case of weir 16 of FIG. 1. The liquid flowing over weir 16 as well as the liquid passing from outlet 12 is discharged to outlet 18. The bypass inlet line 22 is shown in FIG. 2 to pass underneath the tank as shown by the dotted lines and has a plurality of outlets 24 to allow the liquid to enter into the tank at the bottom, while the baffles 24b direct the flow toward the drain 12. A similar outlet 24c, also connected with bypass line 22, passes through the bottom of each wing, and each outlet 24c is provided with a baffle 24d directing the flow from the wing toward the center of the tank, for scavaging purposes. Conduit 23 passes around the side walls of the tank 10 and has a number of spaced openings 30 to allow the surgically cleaned liquid passing from the filter and heat exchange unit to pass back into the tank from the sides. Preferably openings 30a, similar to openings 30, and connected with conduit 23, are placed at both the head end and the foot end, as shown in FIG. 2a which is a detail view at either the head end or foot end. The openings 30a provide the advantage of a flow from both ends toward the middle of the tank. The combination of the wing openings 24c and the end openings 30a may be used either in addition to, or in lieu of, the bottom openings 24.

Wheels 80 are attached to the tank so that the tank may be moved without disturbing the patient. The tank may also have a plurality of snaps 81 attached around the top edge of the tank to attach a tonneau cover (not shown) over the tank so that the patient may have the comfort of privacy.

The conduits 18, 22 and 23 in FIG. 2 represent conduits similar to those represented by the same numbers in FIG. 1, and pass to a slurry tank, filter and heat exchanger arrangement like that shown in FIG. 1.

FIGS. 3 and 4 show a cart 85 adapted to hold the filter unit 28 and deodorizer 28a and heat exchanger 29, used with the tanks of FIGS. 1 and 2. Outlet 18 of the tank is connected to pass liquid through pump 20 to line 23 of the filter system, and through valve 27 to a filter bank comprising four cylindrical filter units 86, 87, 88 and 89, each having an inlet 90 disposed at an upper portion and an outlet 91 disposed adjacent the bottom of the filter. The filter units are connected in parallel for maximum fluid flow through the filter system, and through the deodorizing tanks 92 and 93 connected in parallel. The liquid is forced through the filter units 86, 87, 88 and 89 by the pressure from the action of the pump 20 along with the force of gravity. The liquid then passes through the bank of deodorizers is consisting of deodorizer units 92 and 93, also connected in parallel and each having an inlet 94 disposed at the upper portion and an outlet 95 disposed adjacent the bottom. The liquid passes from outlet 95 of tanks 92 and 93 through a pipe line to the heat exchanger 29.

Heat exchanger 29 removes any excess heat over a predetermined level which has accumulated by the action of the pump and motor and body heat transferred from the patient to the liquid. A sampling conduit 96 is connected from the inlet to the pump to the heat exchanger to obtain the temperature of a sample of the liquid within the tank so that the thermostat 46 may be set for a desired level. The purpose of the thermostat in the heat exchanger is to maintain the temperature of the liquid in the immersion tank at a predetermined level.

Figure 5:
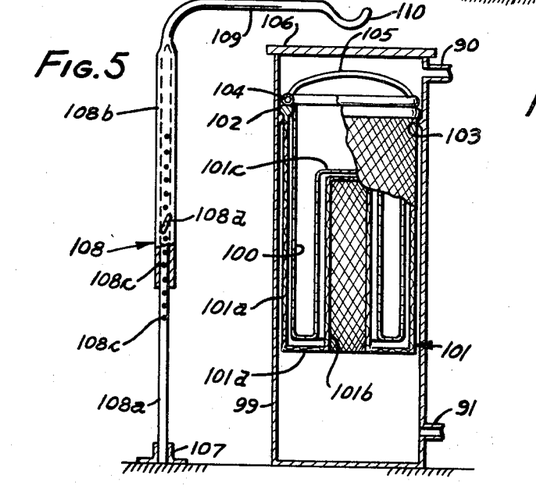
FIG. 5 is a section view of a filter cartridge taken at line 5—5 of FIG. 3.
Figure 6:
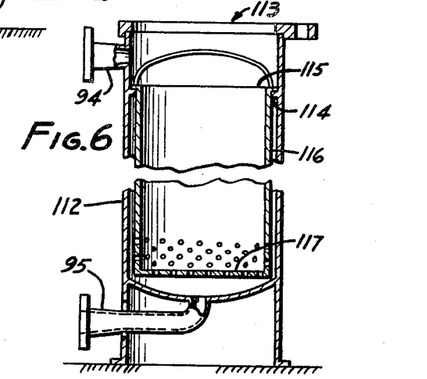
FIG. 6 is a section view of a deodorizer unit taken at line 6—6 of FIG. 3.

FIG. 5 shows a cross-section view of one of the filter unts 86, 87, 88 and 89. Each filter unit comprises a cylindrical tank 99 having its inlet 90 and outlet 91 to allow liquid to pass through the filter and a septum 100 contained therein in the path of flow between the inlet and the outlet. The septum is a cylindrically shaped piece of porous material such as a natural cloth or paper or fine mesh material such as a vinyl cloth or other synthetic filter fabric having minute pores, and having a closed end as shown. The septum is supported by a wire screen form 101 rigid enough to maintain its desired configuration which is in the form of an outer cylindrical portion 101a and an inner cylindrical portion 101b closed at its upper end by a circular portion 101c, these cylindrical portion being connected at their lower ends by a annular end portion 101d. By pulling the closed end of the septum up through itself as shown in the drawing, a maximum surface area may be obtained for the liquid to pass therethrough. The wire screen form has a metal ring 102 extending around the upper opening which nests upon stops 103 attached around the inner periphery of cylinder 99. The septum thereby takes the shape of the wire screen form and is supported within the cylinder by a metal ring 104 attached to the rim of the septum at the open upper end; the ring 104 being supported on metal member 102 as shown. A handle 105 is attached to metal ring 104 so that the septum may be raised, after removing the tank cover 106, out of the filter cartridge for draining back into the filter tank without spilling contaminant or liquid. To facilitate the draining, there is provided at the floor near each tank, a sleeve 107 into which is placed the end of an upright rod 108 which extends to a position higher than the tank where it is bent over at 109 to form a hook 110. The rod 108 is rotatable in sleeve 107 such that the hook can be swung directly over the center of the tank. Thus the handle 105 can be hung on the hook while the draining occurs. It is formed of two telescoped portions 108a and 108b each having a series of holes 108c adapted to be aligned and receive a cotter pin 108d to adjust the height of the hook.

As previously mentioned, a coating substance, such as diatomaceous earth, is put into the slurry pot 39 and mixed with the bacteriostatic liquid, forming a slurry which is a suspension of the insoluble diatomite in the silicone fluid. Valve 27 is opened and the slurry is pumped into filters 86, 87, 88 and 89. The diatomaceous earth of the slurry has a particle size which is too large to pass through the pores of the septum and will thus adhere to the septum tending to cover its pores by bridging over them. This builds up on the septum a porous coat or cake of the diatomite, which coat has smaller pores than those of the septum. By pumping a sufficient amount of the slurry to the septum, there is created a cake of such porosity that the filter is made to pass only the bacteriostatic liquid, as well as any other matter which has a molecular size as small, or smaller than, that of the immersion liquid. This type of filter also removes such water as is entrapped in the liquid medium by absorption, in a well known manner regardless of whether the water molecules are smaller than the silicone fluid molecules.

A preferred form of the diatomaceous earth cake can be prepared by using in the slurry a diatomaceous earth having the characteristic of a two micron retention for the initial coating on the septum, this being a precoat. Following this initial application of slurry to the septum, another slurry is made in the slurry tank from a diatomaceous earth having the characteristic of a 0.2 micron retention; and this is then pumped to the filters to apply as an overcoat over the precoat on the septum. A suitable diatomaceous earth for use in making the precoat is obtainable from Johns-Manville Company of New York, N.Y., as their grade 545 diatomaceous earth. A suitable diatomaceous earth for the overcoat is obtainable from the Johns-Manville Company as their grade 503 diatomaceous earth.

It is preferred that the filter pass approximately five gallons of liquid per minute. The filters are "made" by the aforementioned process to pass all particulate matter which is 0.2 micron in size or less and to collect and thus filter out particulate matter of greater than 0.2 micron. Most bacteria have a size of roughly 0.4 micron or greater, and hence are filtered out together with other particulate matter. However, some bacteria are less than 0.2 micron in size; but since such a filter also has the property of absorbing water, these small size bacteria are also filtered out because they have a tendency to remain with the water in the filter material rather than pass through the filter with the bacteriostatic liquid.

Periodically during a treatment according to this invention, the cakes of diatomaceous earth in the filter will acquire a substantial amount of water by absorption. Accordingly, from time to time it will be desirable to add a desiccant which may be, for example, asbestos fibers or even a further application of diatomaceous earth to the cake, or a combination of both.

It should be recognized that other substances than diatomaceous earth could be used for filtering. For example, asbestos fibers could be used to coat the septum in lieu of, or in addition to, the diatomaceous earth; as asbestos fiber in addition to being a desiccant, is also a good filtering material.

Alternatively, some other substance having good filtering properties could be used to coat the septum such as, for example, an exploded ash type of product. One such exploded ash is expanded perlite.

While it is realized that the bacteriostatic liquid may be cleaned by other methods such as by X-rays, ultra violet light, a hot over or open flame, it is felt that these methods are less satisfactory and more objectionable than the type of filtering used herein. The bacteriostatic liquid must not break down during the treatment of the patient and loose its chemical properties; and the silicone fluids preferred in the practice of the invention posses the desirable attribute that they can be heat sterilized at up to 300° F. with no change whatsoever. This quality would be advantageous if filtration were not used for any reason. Secondly, the mere use of X-rays, ultra violet or heat does not remove particulate matter from the liquid. It is therefore preferable that the liquid be cleansed mechanically by the use of the filters.

Upon passing through the filters 86, 87, 88 and 89, the liquid is surgically clean, however it may still have aromatics or other substances derived from the body of the patient which may give off objectionable odors. Deodorizers 92 and 93 each comprise substance which will function to absorb such odor-producing substances from the liquid. For example, the imersion liquid can be caused to percolate down through activated coconut shell charcoal in the deodorizers whereby objectionable odors will be removed by the charcoal. Upon passing from outlet 95 of deodorizers 92 and 93, the liquid is chemically clean and substantially odorless. Upon passing through the heat exchanger, the liquid then passes back into the tank 10.

A suitable form of deodorizer for use as the deodorizer units 92 and 93 is shown in FIG. 6. It comprises a tank 112 similar to one of the filter tanks 99 and provided with a cover 113 which can be similar to the cover 106 of the filter tank. A shoulder 114 inside the tank and near the top provides support for the rim 115 of a tubular basket 116 having a bottom 117. The bottom and also the lower end of the tube are of perforate material so that the liquid can pass through it. This basket is filled with the activated charcoal. Inlet opening 94 at a top and outlet opening 95 at the bottom of the tank permit the liquid to enter and to leave the tank as in the case of the respective openings 90 and 91 of the filter unit. Thus, the outlet from the four filter units 86, 87, 88 and 89 is carried to the two inlet openings 94 of the deodorizer units as shown in FIG. 4, the outlets 95 being connected with the heat exchanger as is also shown in FIG. 4.

The entire force upon the liquid passing through the filtering and deodorizing system and heat exchanger is provided by the pump. Valves 25 and 27 may both be opened at the same time to allow some of the liquid to pass through the filter, deodorizer and heat exchanger systems while another portion of the solution will be recirculated from the tank through the pump and back through the tank. This provides additional circulation and turbulence of the fluid in the system, which is desirable for treatment of the patient.

It is recognized that the filters and deodorizers will need to be reconstituted from time to time, and this may readily be done by use of the valve system, as described hereinabove, without removing the patient from the liquid of the tank.

It is desirable, as indicated above, to have a flow of about five gallons of liquid per minute through the filter; which will be the total flow through all the openings connected with conduit 23. It is desired that the rate of flow for the cleaning action shall be considerably higher, such as about fifteen gallons per minute; which will be the total flow through all the openings connected with the by-pass conduit 22.

Figure 7:
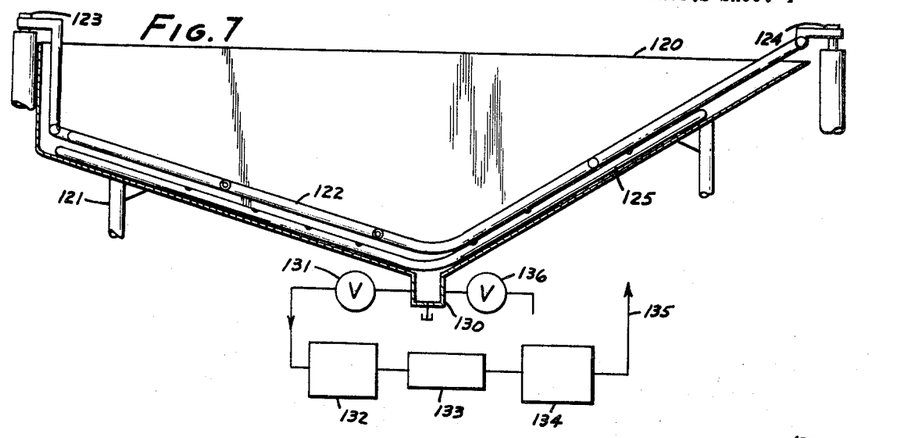
FIG. 7 is a schematic diagram, partly in cross-section, of a system for immersion treatment with provision for means for blowing gas or air into liquid in the tank, according to this inventon.

FIG. 7 illustrates a longitudinal cross-section view of a tank according to this invention which is provided with means for injecting air jets beneath the patient. The tank 120 is shown similar in many respects to the tank 10 of FIG. 1. The tank rests on legs 121 in a manner similar to that shown in FIG. 1; and the cradle 122 which supports the patient can be raised or lowered in the tank by hydraulic lifters 123 and 124 at the foot and head ends, respectively, in a manner similar to the cradle arrangement in FIG. 1.

Figure 8:
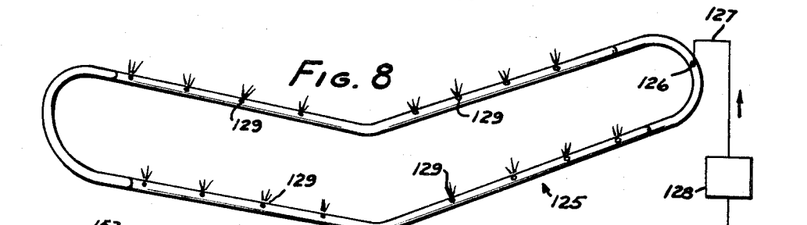
FIG. 8 shows a loop of a conduit into which the air or gas is introduced under pressure, to be expelled into the liquid.

Between the cradle and the bottom of the tank, there is provided a loop 125 formed as shown in perspective in FIG. 8. This loop comprises piping which can be made of pipe sections welded together as shown. The only inlet to the pipe loop is an inlet opening 126 adapted to be fitted with an air hose or line 127 shown schematically as a single line, through which air is pumped from an air pump 128 in the direction shown by the arrow to send air into the piping of the loop along both sides of the loop. The loop 125 is shaped to conform with the bottom of the tank and the two sides of the loop are generally parallel to each other and spaced somewhat apart and dimensioned to fit within the side walls of the tank. There are provided a number of openings 129 along the upper surface of the arms of the loop which are beneath the patient, through which the injected air can be exhausted from the loop to produce a turbulent effect in the liquid of the tank beneath the patient. This can be used to advantage to remove dead tissue and skin and the like from burn wounds without excessive discomfort to the patient.

In the structure of FIG. 7, no specific provision is shown for circulating the liquid into and through the tank. There is shown in schematic form, however, at the lowermost outlet 130 of the tank, a valve 131 in a conduit (shown in single line form) through which liquid is brought through a filter 132, and then to a suitable deodorizer 133 and then to a suitable heat exchanger 134 which functions to maintain the liquid temperature at the desired level; from whence the filtered fluid is returned to the tank through conduit 135. It will be understood that suitable pumping means (not shown) will be used in the conduit to return the fluid to the tank. The actual entrances of the filtered fluid into the tank from conduit 135 are not shown. It is understood, however, that the fluid may be brought into the tank at a desired place or places. It may for example be brought up as a hose over the side of the tank so that the hose empties into the tank. For example, the conduit 135 may correspond with conduit 23 of FIGS. 1 or 2; and the fluid may be brought into the tank from the sides or ends, or both, by use of passageways from the conduit into the tank as represented by openings 30 or 30a, or both, in FIGS. 1, 2 and 2a. The valve 136 is a drain valve to drain the tank when desired.

Figure 9:
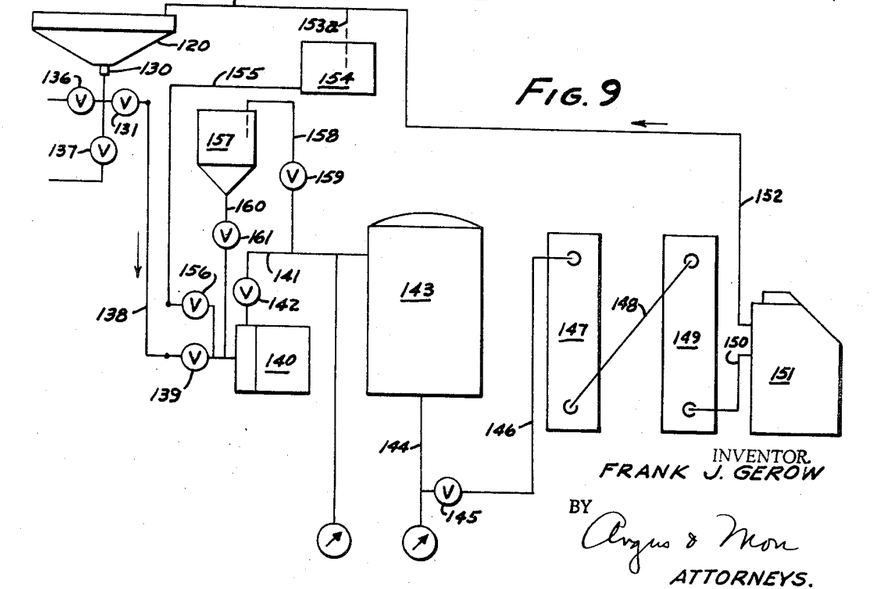
FIG. 9 is a schematic diagram, partly in cross-section, of a system for immersion treatment according to this invention in which means is provided for emptying and diverting and filling the immersion tank.

FIG. 9 shows schematically a system of more versatility than that shown in FIG. 7. The immersion tank 120 is similar to the same numbered tank of FIG. 7, and the valves 131 and 136 at the exit from the lower outlet 130 correspond with the same numbered valves in FIG. 7. Valve 137 can be used to drain the last residual oil from the tank and its outlets when desired. The outlet from valve 130 is brought through a conduit 138 through a valve 139 to a pump 140, the output of which is sent through a conduit 141 through a valve 142 to a filter tank 143 which can correspond to the filter 132 of FIG. 7. The output of the filter 143 is brought through a conduit 144 through a valve 145; then through a conduit 146 to the upper part of a drying tower 147 through which the fluid drops and in the course of which, water in the fluid is eliminated. The drying tower may be of a suitable type capable of separating water from the fluid. The output of the tower 147 is carried through a conduit 148 to a deodorizing tower 149 which may be of a type previously described herein. The output from the deodorizer is carried through a conduit 150 to a heat exchanger 151 adjusted to bring the fluid to a desired temperature, ordinarily by cooling. The output of the heat exchanger is carried through a conduit 152 and brought back into the tank 120. For this purpose, the delivery end of the conduit at 153 is preferably arranged as a flexible hose so that the outlet end can be caused to hang over the edge of the tank so that it discharges into the tank. In the operation of this system, the fluid flow is in the direction of the arrow.

A storage tank 154 is provided as a container of the fluid for the tank. Thus, tank 154 may contain the silicone fluid or oil used in the immersion treatment; and its outlet brought through a conduit 155 and through a valve 156 to the input of the pump 140.

A container 157 is provided as a mixer or slurry tank for the filtering substance to be applied to the filtering surfaces of the filter 143. This mixing tank 157 may be similar to the slurry tank 39 of FIG. 3. For the purpose of operating the mixer 157, a conduit 158 containing a valve 159 is connected to the conduit 141 downstream from the pump 140, to empty into the top of mixer 157 containing the diatomaceous earth. The output from the mixer is brought through a conduit 160 and a valve 161 to the input of the pump.

In the normal operation of the system, valves 136 and 137, 156, 159 and 161 are closed and valves 131, 139, 142 and 145 are open. When the pump is running this will circulate the fluid through the system and through the tank; the base 153 being positioned to empty into the tank.

When it is desired to divert the fluid from the tank, the flexible hose 153 is removed from over the side of the tank and is brought into the top of the storage tank 154 as shown by the broken line 153a. This will put the fluid into the storage tank while emptying the immersion tank for cleaning or any other purpose. When it is desired to refill the immersion tank 120, the valve 156 will be open to send the fluid from the storage tank back into the system to fill up the immersion tank, while the hose end 153 is brought into the immersion tank instead of into the storage tank.

For the purpose of coating the filter elements, valves 159 and 161 will be open which will send the fluid from the system into slurry tank 157 to form the slurry with the diatomaceous earth in the slurry tank. Then upon closing valve 159 and opening valve 161 the slurry will be pumped into the filter for performing the coating operation in a manner similar to that described in connection with FIGS. 3 and 4.

One of the purposes of being able to empty the silicone fluid from the immersion tank is to be able to substitute a different liquid in the tank for treatment of the patient. This will ordinarily be a water bath which may be warmed and may contain soap or detergent. After the immersion tank is emptied into the storage tank as described above, the water can be sent into the immersion tank through a suitable flexible hose (which is not shown). For this water treatment, the loop 125 will be set into the tank beneath the patient and air will then be sent through it as explained above to bubble out through the water beneath the patient. This creates a strong turbulence with gentle agitation around the skin of the patient which promotes the washing action. Preferably soap is added to the water in this treatment. This will remove burned tissue and silicone fluid from the patient's wounds without the requirement of manually wiping the skin of the patient. Following this treatment the water will be drained away through valve 136.

Then the flexible hose 153 will be moved back into the immersion tank and the silicone fluid recovered into the system through valve 156, following which 156 will be closed.

The foregoing method of treatment can be modified somewhat by the ommission of the water bath step. When this is done a hose can be added, for example, at the outlet from valve 136 or valve 137 and the silicone fluid or oil pumped preferably by a larger pump than the regular filtering pump 140, through a nozzle (not shown) to direct it by hand against the patient to wash his wounds. This can be done while the main system continues its filtering operation.

As an alternative to the hand held nozzle for delivering the silicone fluid or oil, the said larger pump than the regular filtering pump 140 can have its outlet connected directly to line 127 (FIG. 8), (the air pump 128 being disconnected from line 127, as by a disconnect valve or other means), so that the silicone fluid will thereby be pumped under considerable pressure through the loop 125 so that the silicone fluid will be sprayed against the patient through openings 129 with sufficient force to wash the wounds of the patient above the loop.

It will be recognized that the cradle 122 itself may, if desired, be made of tubing like the tubing 125 of FIG. 8 and provided with holes similar to holes 129 of FIG. 8 directed toward the patient; and the output from the said larger pump can then be connected to the tubing of such a cradle in a manner similar to the connection of line 127 to the loop 125 of FIG. 8.

The arrangements of FIGS. 7 to 9 provide refined methods of removing solids from wounds, which usually require some form of cleaning out, for example by swabbing or by water bath. This system and method permits the patient to remain on the support rack within the immersion tank so that he does not need to be removed to a separate water bath for the cleaning out of the wound.

In the practice of the invention it will ordinarily be required that the patient be strapped in position by a suitable harness of a type which will prevent his head from slipping beneath the surface of the liquid, which if it should occur would cause drowning. For this purpose such harness should prevent the patient from slumping down and it should also prevent him from turning over sufficiently to allow his head to go under the liquid. Suitable harnesses for this purpose are available and it is not necessary to disclose any particular harness here.

The materials of the tanks and their parts in contact with the fluid should be such that they can be kept very clean to avoid any support for the growth of bacteria. Stainless steel is a suitable material.

It will be understood that modifications and changes may be made in the equipment and process without departing from the scope of the invention. For example, the process can be carried out in a simple system as illustrated in my said abandoned copending United States application Ser. No. 247,637 which shows a basic system. The figures of the present application, while showing all that appears in said United States application Ser. No. 247,637 also shows added improvements which are important for reasons discussed above; but it should be understood that the ommission of some or all of these improvements does not depart from the invention. Furthermore, additions to or modifications of, the arrangements shown in the present application do not depart from the invention.

This invention is not to be limited to the herein description or the accompanying drawings which are given by way of example and not of limitation, but only in accordance with the scope of the appended claims.

What is claimed is:

1. The method of treatment of burns on a living body which comprises immersing at least a portion of the afflicted area of the living body in a bath of an end-blocked siloxane fluid of empirical structure $$R_n SiO_{\frac{4-n}{2}}$$

in which R is chosen from the group consisting of lower alkyl and phenyl radicals and $n$ has an average value of from 1.85 to 2.25, said fluid having a viscosity of from 50 cs. to 1000 cs. at 25° C., the temperature of said bath being maintained at a temperature between about 80° F. and 94° F. during immersion.

2. The method in accordance with claim 1 in which the fluid is continually filtered to remove bacteria therefrom at a rate faster than the rate at which bacteria appear in said fluid.

3. The method of claim 1 in which some of the R substituents are phenyl radicals and substantially the remainder of said radicals are methyl radicals.

4. The method of claim 1 in which the siloxane fluid is a mixture of a dimethyl fluid and of a copolymer of dimethylsiloxane and phenylmethylsiloxane, said mixture being in such proportions as to give a specific gravity for said mixture between 0.974 and 1.06.

5. Method in accordance with claim 1 in which the R substituents are methyl radicals and $n$ has a value of 2.

6. Method as defined in claim 1, further including sending air through the fluid toward the body to direct fluid turbulence against the body.

7. Method as defined in claim 1, further comprising after immersing said body in said siloxane fluid then immersing the living body in a water bath and sending air through the water of the bath toward the body to direct fluid turbulence against the body.

(References on following page)

References Cited

UNITED STATES PATENTS

| | | | |
|---|---|---|---|
| 2,084,465 | 6/1937 | Stoughton | 167—86 |
| 2,176,508 | 10/1939 | Neu | 167—86 |
| 2,649,861 | 4/1953 | Melsheimer | 128—369 |
| 3,085,576 | 4/1963 | Rocke | 128—369 |
| 2,947,419 | 8/1960 | Kasten | 210—435 |
| 2,979,209 | 4/1961 | Nolden | 210—435 |

FOREIGN PATENTS 158,442   4/1957   Sweden.

OTHER REFERENCES

Adamczak et al., Acta Chirurgiae Plasticae, vol. 3, pp. 49–58, January 1961.

Baromdes et al., The Military Surgeon, vol. 106, No. 5, pp. 379–387, 1950.

Colebroek et al., The Lancet, June 12, 1948, pp. 893, 895, 897 and 899.

Fauntleroy, Am. J. of the Medical Sciences, vol. 129, pp. 989–991; 1905.

Gerow et al. (I), The Bulletin of the Dow Corning Center for Aid to Medical Research, vol. 6, No. 1, pp. 1 and 2, January 1964.

Gerow et al. (II), Transactions of the Third International Congress of Plastic Surgery, pp. 146–151, October 1963.

Hannay, British medical Journal, July 12, 1941, pp. 821–823, November 1944.

Goldburg, The Lancet, March 18, 1944, pp. 371–372.

Whittet, Soap, Perfumery, and Cosmetics, vol. 17, pp. 46–48.

RICHARD L. HUFF, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,243                                    September 19, 1969

Frank J. Gerow

It is certified that error appears in the above identified patent and that said Letters Patent are hereby corrected as shown below:

Column 2, line 6, "essentials" should read -- essential characteristics --; line 11, "essential" should read -- essentially --. Column 3, line 63, "° C. Below about 25" should read -- Below about 25° C. --. Column 6, line 31, "adsorbed" should read -- absorbed --. Column 11, line 10, cancel "is"; line 27, "unts" should read -- units --. Column 12, line 58, "over" should read -- oven --; line 63, "posses" should read -- possess --.

Signed and sealed this 2nd day of June 1970.

(SEAL)
Attest:

Edward M. Fletcher, Jr.                          WILLIAM E. SCHUYLER, JR.

Attesting Officer                                            Commissioner of Patents